(12) United States Patent
Strogov et al.

(10) Patent No.: US 12,216,785 B2
(45) Date of Patent: Feb. 4, 2025

(54) SYSTEMS AND METHODS FOR GENERATING FILE SYSTEMS OF DATA SOURCES INCOMPATIBLE WITH ANTI-VIRUS SCANNERS

(71) Applicant: Acronis International GmbH, Schaffhausen (CH)

(72) Inventors: Vladimir Strogov, Moscow (RU); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 314 days.

(21) Appl. No.: 17/949,571

(22) Filed: Sep. 21, 2022

(65) Prior Publication Data
US 2024/0095384 A1    Mar. 21, 2024

(51) Int. Cl.
*G06F 21/62* (2013.01)
*G06F 21/56* (2013.01)

(52) U.S. Cl.
CPC .......... *G06F 21/6218* (2013.01); *G06F 21/56* (2013.01); *G06F 2221/034* (2013.01)

(58) Field of Classification Search
CPC . G06F 21/56; G06F 21/6218; G06F 2221/034
See application file for complete search history.

(56) References Cited

U.S. PATENT DOCUMENTS

| 2002/0120693 A1* | 8/2002 | Rudd | H04L 51/066 709/206 |
| 2007/0028110 A1* | 2/2007 | Brennan | H04L 63/18 713/176 |
| 2019/0394221 A1* | 12/2019 | Xiao | H04W 12/128 |

FOREIGN PATENT DOCUMENTS

WO    WO-2023151472 A1 *   8/2023   .......... G06F 16/532

\* cited by examiner

*Primary Examiner* — Matthew T Henning
(74) *Attorney, Agent, or Firm* — ArentFox Schiff LLP; Michael Fainberg (57) ABSTRACT

Disclosed herein are systems and method for generating file systems of data sources incompatible with anti-virus scanners. In one exemplary aspect, the method includes: receiving, from an AV scanner, a request to scan a data source for malicious activity, wherein the data source includes a plurality of files, and wherein the AV scanner has a plurality of compatible file types that the AV scanner is capable of scanning; determining that the plurality of files are inaccessible to the AV scanner; generating a file system corresponding to the data source by parsing contents of the data source; generating a virtual volume including a plurality of sparse files corresponding to the plurality of files in the data source; populating at least one sparse file in the virtual volume with respective parsed content of a corresponding file in the data source; and instructing the AV scanner to scan the virtual volume.

17 Claims, 6 Drawing Sheets

SYSTEMS AND METHODS FOR GENERATING FILE SYSTEMS OF DATA SOURCES INCOMPATIBLE WITH ANTI-VIRUS SCANNERS

FIELD OF TECHNOLOGY

The present disclosure relates to the field of data security, and, more specifically, to systems and methods for generating file systems of data sources incompatible with anti-virus scanners.

BACKGROUND

Anti-virus (AV) scanners are a major component of data security technology. AV scanners are configured not only to periodically scan file systems fully and detect malicious activity, but to actively monitor for malicious activity in real-time. AV scanners may also be integrated with backup technology in which archives are scanned to ensure that system backups are ready for use during recovery. Unfortunately, AV scanners are not compatible with all data sources. Due to the incompatibility, there exist gaping holes in security that need to be filled.

SUMMARY

To address the incompatibility issues, aspects of the disclosure describe methods and systems for generating file systems of data sources incompatible with anti-virus scanners.

In one exemplary aspect, the method includes: receiving, from an AV scanner, a request to scan a data source for malicious activity, wherein the data source includes a plurality of files, and wherein the AV scanner has a plurality of compatible file types that the AV scanner is capable of scanning; determining that the plurality of files are inaccessible to the AV scanner in response to determining that a file type of the data source is not in the plurality of compatible file types; generating a file system corresponding to the data source by parsing contents of the data source using a software development kit (SDK) associated with the data source; generating a virtual volume including a plurality of sparse files corresponding to the plurality of files in the data source; populating at least one sparse file in the virtual volume with respective parsed content of a corresponding file in the data source; and instructing the AV scanner to scan the virtual volume.

In some aspects, the techniques described herein relate to a method, wherein populating the at least one sparse file is in response to receiving a request to scan the corresponding file from the AV scanner.

In some aspects, the techniques described herein relate to a method, further including: in response to receiving, from the AV scanner, an indication that the populated at least one sparse file is malicious, removing the corresponding file in the data source.

In some aspects, the techniques described herein relate to a method, further including: in response to receiving, from the AV scanner, an indication that the populated at least one sparse file is not malicious, removing the respective parsed content from the populated at least one sparse file.

In some aspects, the techniques described herein relate to a method, wherein the virtual volume represents a slice of the data source at first time, further including: generating another virtual volume corresponding to the data source at a second time after the first time; mounting the another virtual volume; and instructing the AV scanner to scan the another virtual volume.

In some aspects, the techniques described herein relate to a method, further including: receiving, from the AV scanner, an indication that a file in the another virtual volume is malicious; determining whether the file was in the data source during the first time by mounting the virtual volume; and in response to determining that the file was in the data source during the first time, marking the slice as unsuitable for backup recovery.

In some aspects, the techniques described herein relate to a method, wherein the data source is one of: a relational database management system (RDBMS), a content management system (CMS), and a mail database.

In some aspects, the techniques described herein relate to a method, where each respective sparse file in the virtual volume is empty and has a virtual size corresponding to a size of a respective file in the data source that corresponds to the respective sparse file.

It should be noted that the methods described above may be implemented in a system comprising a hardware processor. Alternatively, the methods may be implemented using computer executable instructions of a non-transitory computer readable medium.

In some aspects, the techniques described herein relate to a system for anti-virus (AV) scanning incompatible data sources, including: a memory; and a hardware processor communicatively coupled with the memory and configured to: receive, from an AV scanner, a request to scan a data source for malicious activity, wherein the data source includes a plurality of files, and wherein the AV scanner has a plurality of compatible file types that the AV scanner is capable of scanning; determine that the plurality of files are inaccessible to the AV scanner in response to determining that a file type of the data source is not in the plurality of compatible file types; generate a file system corresponding to the data source by parsing contents of the data source using a software development kit (SDK) associated with the data source; generate a virtual volume including a plurality of sparse files corresponding to the plurality of files in the data source; populate at least one sparse file in the virtual volume with respective parsed content of a corresponding file in the data source; and instruct the AV scanner to scan the virtual volume.

In some aspects, the techniques described herein relate to a non-transitory computer readable medium storing thereon computer executable instructions for anti-virus (AV) scanning incompatible data sources, including instructions for: receiving, from an AV scanner, a request to scan a data source for malicious activity, wherein the data source includes a plurality of files, and wherein the AV scanner has a plurality of compatible file types that the AV scanner is capable of scanning; determining that the plurality of files are inaccessible to the AV scanner in response to determining that a file type of the data source is not in the plurality of compatible file types; generating a file system corresponding to the data source by parsing contents of the data source using a software development kit (SDK) associated with the data source; generating a virtual volume including a plurality of sparse files corresponding to the plurality of files in the data source; populating at least one sparse file in the virtual volume with respective parsed content of a corresponding file in the data source; and instructing the AV scanner to scan the virtual volume.

The above simplified summary of example aspects serves to provide a basic understanding of the present disclosure.

This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for generating file systems of data sources incompatible with anti-virus scanners. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
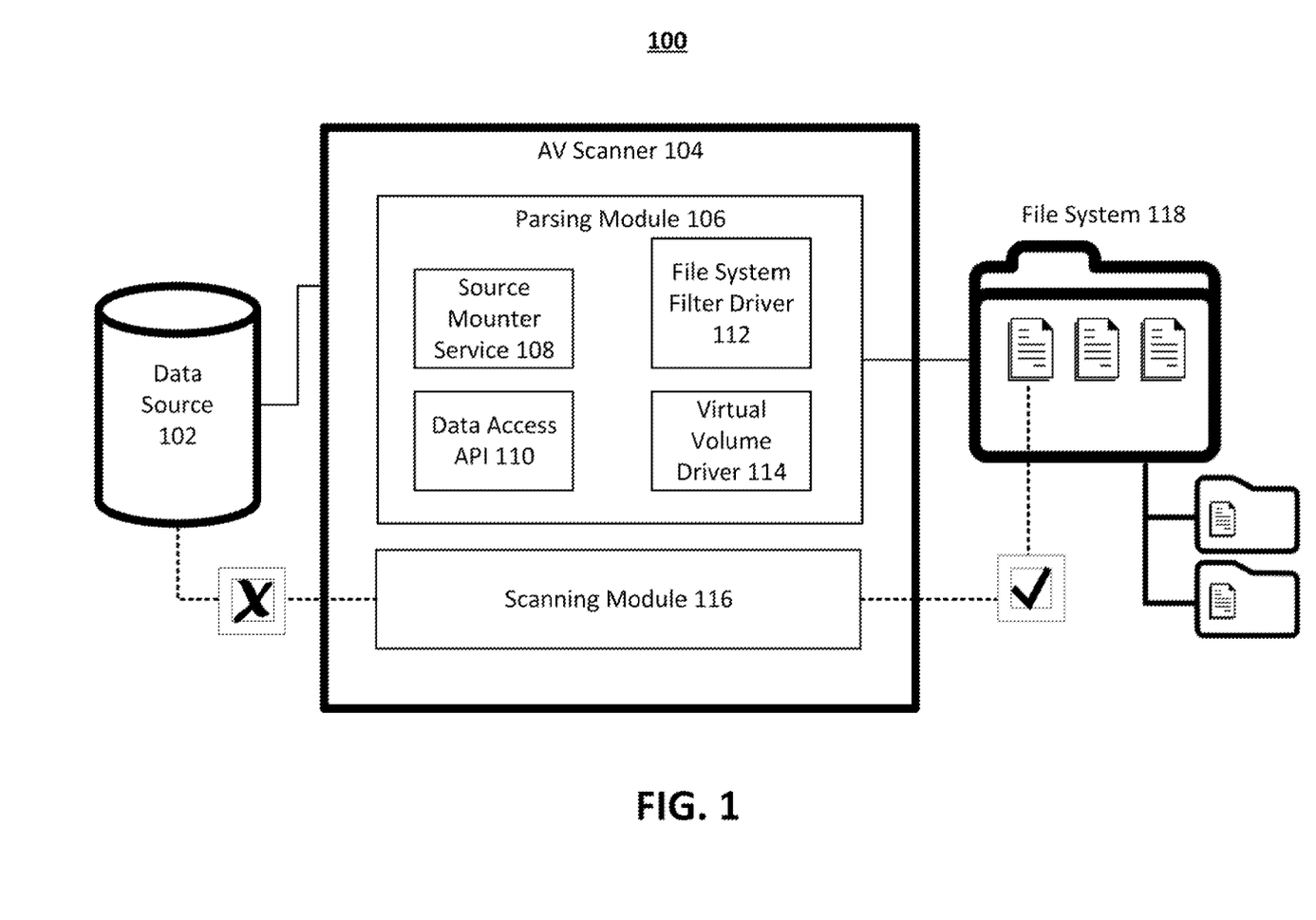
FIG. 1 is a block diagram illustrating a system for generating file systems of data sources incompatible with anti-virus scanners.

FIG. 1 is a block diagram illustrating system 100 for generating file systems of data sources incompatible with anti-virus scanners. There are many types of data that anti-virus (AV) scanners cannot scan directly because the data is in a format that a conventional AV scanner cannot read. An example of such data can include various databases, mail servers (e.g., Microsoft Exchange), and specific archive formats that backup programs create (e.g., ".tib" files that Acronis True Image and Acronis Backup save to). System 100 includes data source 102, which may represent incompatible data (e.g., a ".tib" file or a mail server) that AV scanner 104 cannot scan. In some aspects, data source 102 may include a relational database management system (RDBMS), a content management system (CMS), or a mail database. In some aspects, data source 102 may be stored in any archive storage (e.g., local, cloud, etc.).

As shown in FIG. 1, scanning module 116 of AV scanner 104 cannot access the objects inside data source 102. For example, AV scanner 104 may include metadata (e.g., system files) that indicate a plurality of compatible file types and systems. The type of file(s) associated with data source 102 may not be included in the metadata as part of the plurality of compatible file types and systems. Accordingly, the present disclosure describes parsing module 106, which is configured to understand the format of incompatible data sources, have read access to them, and, if necessary, take a snapshot at a certain point in time. In other words, the parser is a data access provider for scanning module 116. In some aspects, parsing module 106 is a component of AV scanner 104 (as shown in FIG. 1). In other aspects, parsing module 106 is a standalone software application. Information parsed by parsing module 106 is stored in a virtual disk instance (e.g., a virtual volume).

An objective of the present disclosure is to enhance the compatibility of AV scanners that operate on file system volumes using parsing module 106. In some aspects, parsing module 106 includes source mounter service 108, data access API 110, file system filter driver 112, and virtual volume driver 114. In order to generate file system 118, which is a converted version of data source 102 that scanning module 116 can read and scan, a software development kit (SDK) associated with data source 102 is needed. In this case, the SDK includes source mounter service 108 and data access API 110. Source mounter service 108 is configured to create and mount a virtual disk where parsed data is transferred. In general, the virtual disk is created on the system that performs a scan, although it can also be created somewhere in the cloud or in a virtual environment. Data access API 110 is configured to retrieve data from data source 102. For different data types, different APIs may be needed that transform data source objects into file objects (e.g., directories and files). For example, email folders and letters are converted to directories and files respectively. Another example may be records of a relational database that are transformed into folders and files, taking into account the structure of the database tables In some aspects, there may be a different parsing module 106 for each type of data source. For example, a first parsing module may be configured to convert a mailing database into a first file system and a second parsing module may be configured to convert a different mailing database into a second file system. In this case, the first parsing module may be unable to successfully convert the different mailing database into the second file system.

Parsing module 106 includes virtual volume driver 114 that is configured to mount slices in data source 102 as a plurality of empty files (used interchangeably with sparse files). Sparse files are a part of file systems such as NTFS and ReFS. Although sparse files are empty, they have a virtual file size. In particular, virtual volume driver 114 creates a space to project the files extracted by data access API 110. File system filter driver 112 may be a hierarchical storage management (HSM) file system filter driver. HSM is a method for storing files that is supported by operating systems such as Windows and Linux. While virtual volume driver 114 creates sparse files, file system filter driver 112 controls access to these files and fills the files with content as needed (e.g., during scanning or persistently).

Figure 2:
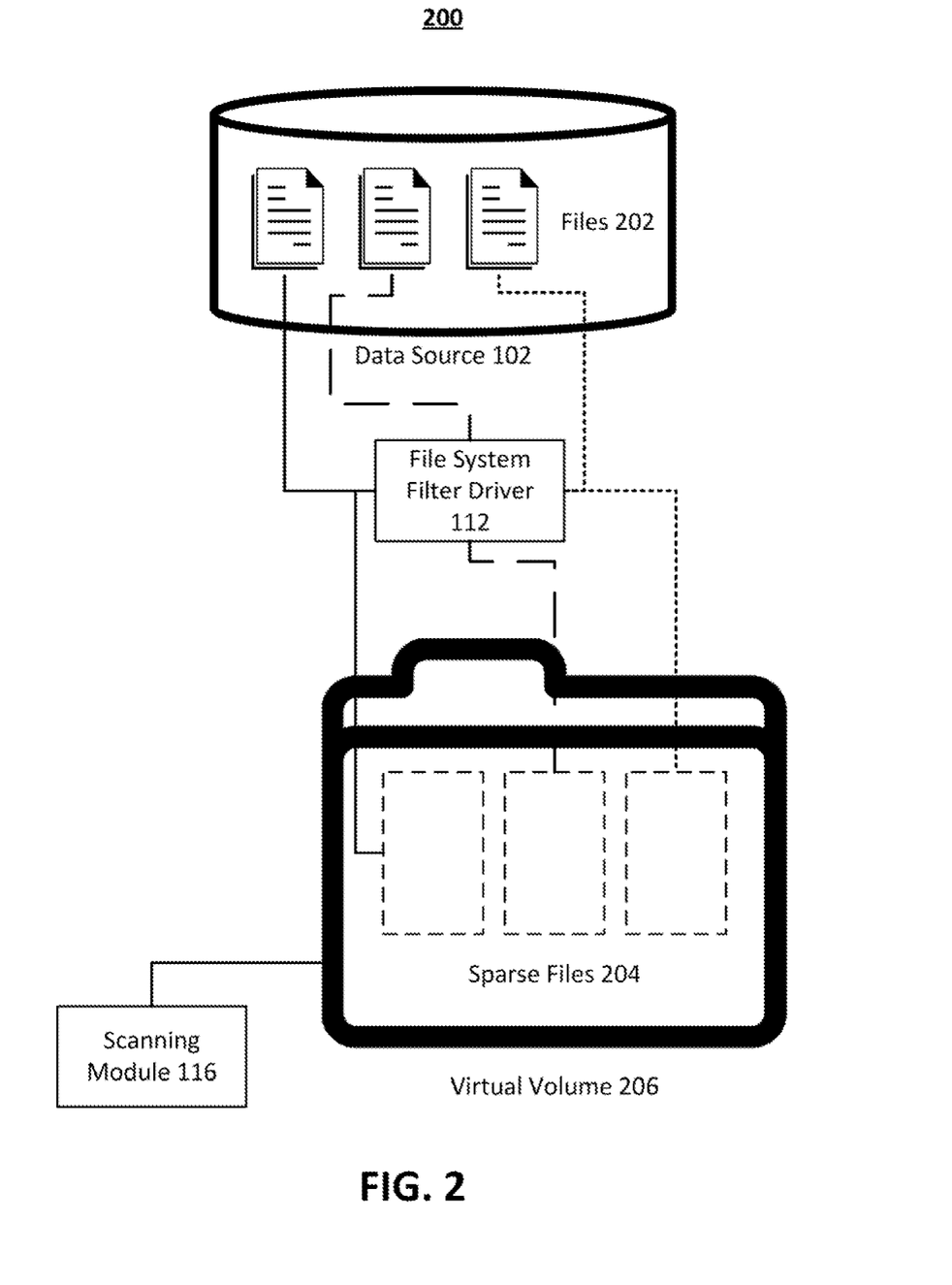
FIG. 2 is a block diagram illustrating an example of pulling file contents from a data source to populate spare files in a parsed file system.

FIG. 2 is a block diagram illustrating example 200 of pulling file contents from a data source to populate spare files in a parsed file system. As described above, parsing module 106 accesses and converts data source 102 to a compatible file format, and creates a virtual volume on which the data is stored as ordinary files. So that these volumes do not take up much space, real data is not stored in them. Instead, using sparse file technology, special placeholders are created, which are filled when necessary (e.g., when scanning a file).

Parsing module 106 thus creates an empty volume with sparse files corresponding (i.e., mapped) to the files in data source 102. The contents of data source 102 is transformed into a set of files on the file system. For example, each of files 202 correspond to sparse files 204. When scanning module 116 attempts to access sparse files 204, filter driver 112 fetches the data from parsed data source 102 and fills the scanned files. In some aspects, filter driver 112 fetches specific data corresponding to the specific file requested by scanning module 116. Thus, data is retrieved one at a time. In some aspects, filter driver 112 removes the data from file system 118 (i.e., from the virtual disk) after scanning module 116 has scanned the file and no issues are found.

Figure 3:
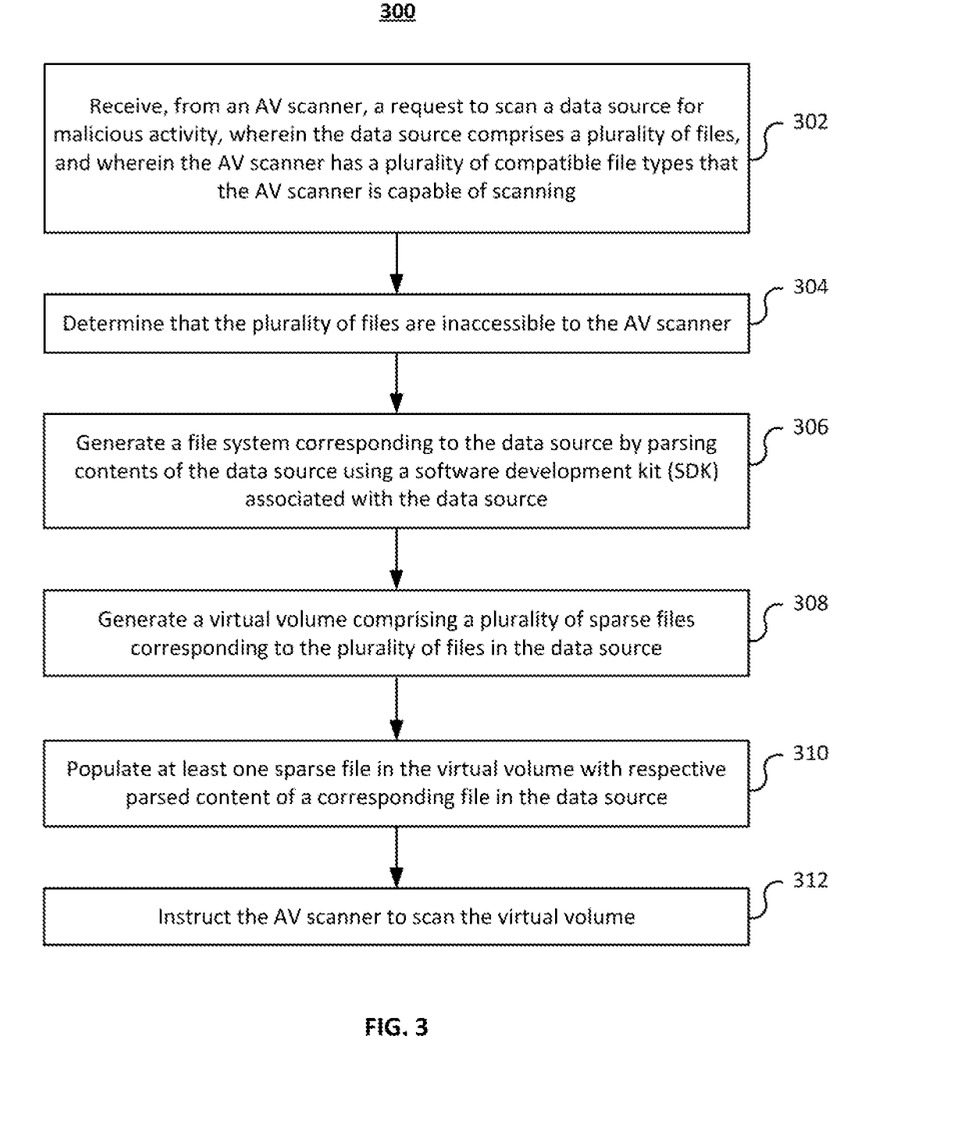
FIG. 3 illustrates a flow diagram of a method for generating file systems of data sources incompatible with anti-virus scanners.

FIG. 3 illustrates a flow diagram of method 300 for generating file systems of data sources incompatible with anti-virus scanners. At 302, parsing module 106 receives, from an AV scanner 104 (e.g., scanning module 116), a request to scan data source 102 for malicious activity. Data source 102 comprises a plurality of files (e.g., documents, images, applications, etc.). AV scanner 104 has a plurality of compatible file types that AV scanner 104 is capable of scanning.

At 304, parsing module 106 determines that the plurality of files are inaccessible to the AV scanner in response to determining that a file type of the data source is not in the plurality of compatible file types. For example, data source 102 may be a ".tib" file (i.e. a disk image file) and a ".tib" file may not be included in the plurality of compatible file types.

At 306, parsing module 106 generate file system 118 corresponding to the data source by parsing contents of data source 102 using a software development kit (SDK) associated with the data source 102. For example, the SDK may enable parsing module 106 to access the contents of a ".tib" file.

At 308, parsing module 106 generates virtual volume 206 comprising a plurality of sparse files 204 corresponding to the plurality of files 202 in data source 102. In some aspects, each respective sparse file in virtual volume 206 is empty and has a virtual size corresponding to a size of a respective file in data source 102 that corresponds to the respective sparse file.

At 310, parsing module 106 populates at least one sparse file in virtual volume 206 with respective parsed content of a corresponding file in data source 102. In some aspects, populating the at least one sparse file is in response to receiving a request to scan the corresponding file from the AV scanner.

At 312, parsing module 106 instructs AV scanner 104 to scan virtual volume 206.

Figure 4:
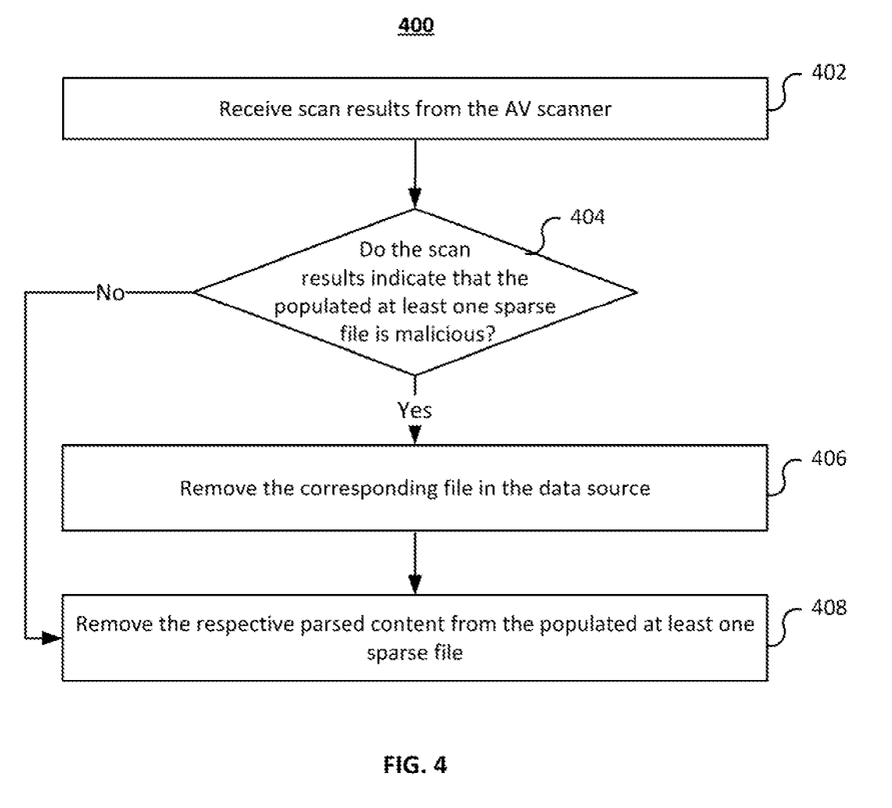
FIG. 4 illustrates a flow diagram of a method for removing malicious files from a data source incompatible with an AV scanner.

FIG. 4 illustrates a flow diagram of method 400 for removing malicious files from a data source incompatible with an AV scanner.

At 402, parsing module 106 receives scan results from AV scanner 104. At 404, parsing module 106 determines whether the scan results includes an indication that the populated at least one sparse file is malicious. In response to determining that the scan results indicate the populated at least one sparse file is malicious, method 400 advances to 406, where parsing module 106 removes the corresponding file in data source 102. At 408, parsing module 106 then removes the respective parsed content from the populated at least one sparse file. However, if at 404, parsing module 106 determines that the populated at least one sparse file is not malicious, method 400 advances from 404 to 408 (i.e., the corresponding file remains in the data source).

Figure 5:
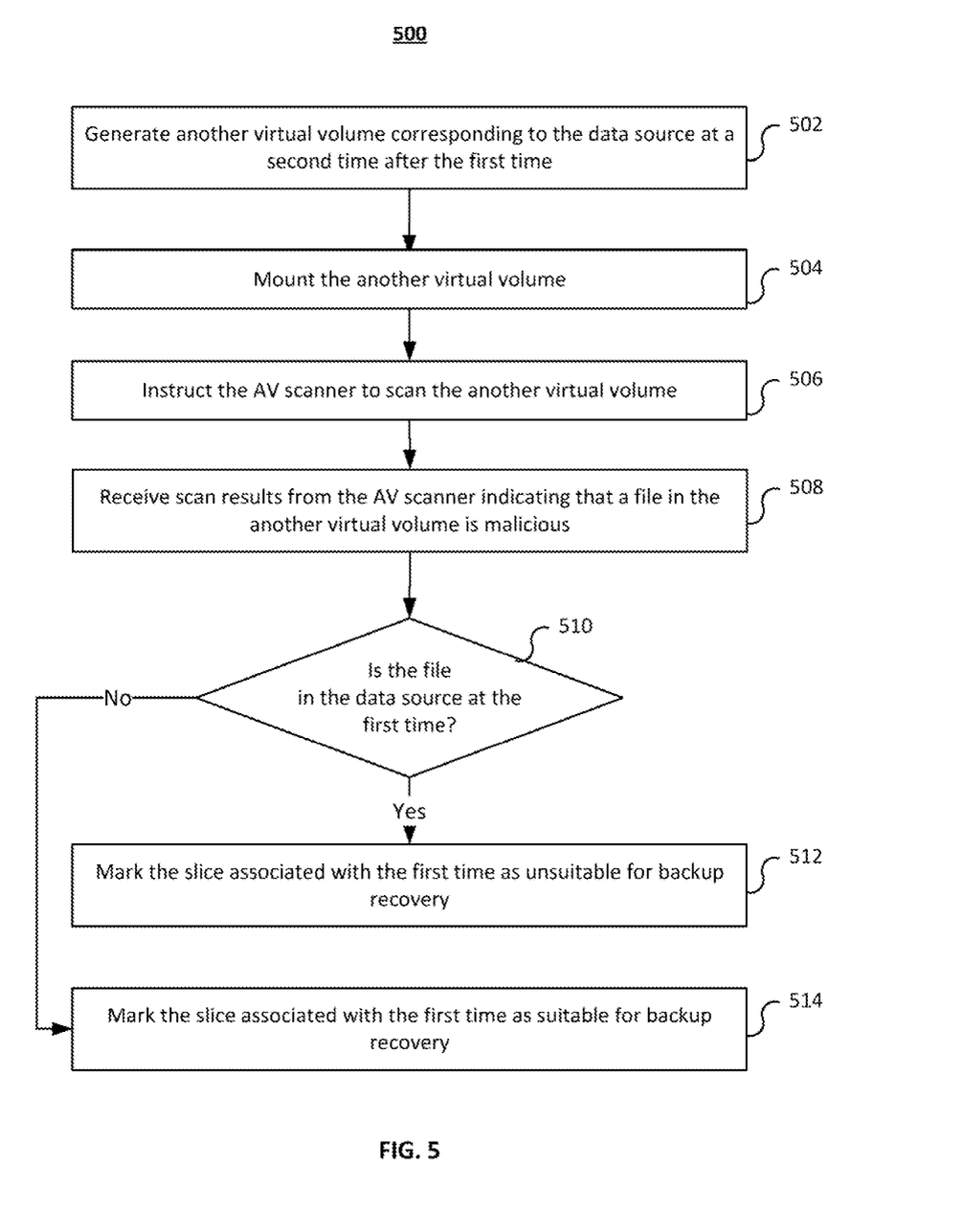
FIG. 5 illustrates a flow diagram of a method for marking slices of the data source as suitable or unsuitable for backup recovery.

FIG. 5 illustrates a flow diagram of method 500 for marking slices of the data source as suitable or unsuitable for backup recovery. Suppose that virtual volume 206 represents a slice of data source 102 at a first time (e.g., Monday at 3:00 pm). At 502, parsing module 106 generates another virtual volume corresponding to data source 102 at a second time after the first time (e.g., Tuesday at 3:00 pm in the case of daily evaluations). At 504, parsing module 106 mounts the another virtual volume. At 506, parsing module 106 instructs AV scanner 104 to scan the another virtual volume.

At 508, parsing module 106 receives scan results from AV scanner 104 with an indication that a file in the another virtual volume is malicious. At 510, parsing module 106 determines whether the file was in the data source during the first time by mounting and searching through virtual volume 206. In response to determining that the file was in the data source during the first time, method 500 advances to 512, where parsing module 106 marks the slice as unsuitable for backup recovery. If the file is not in the data source at the first time (i.e., no malicious files are in the data source at the first time), at 514, parsing module 106 marks the slice associated with the first time as suitable for backup recovery.

Figure 6:
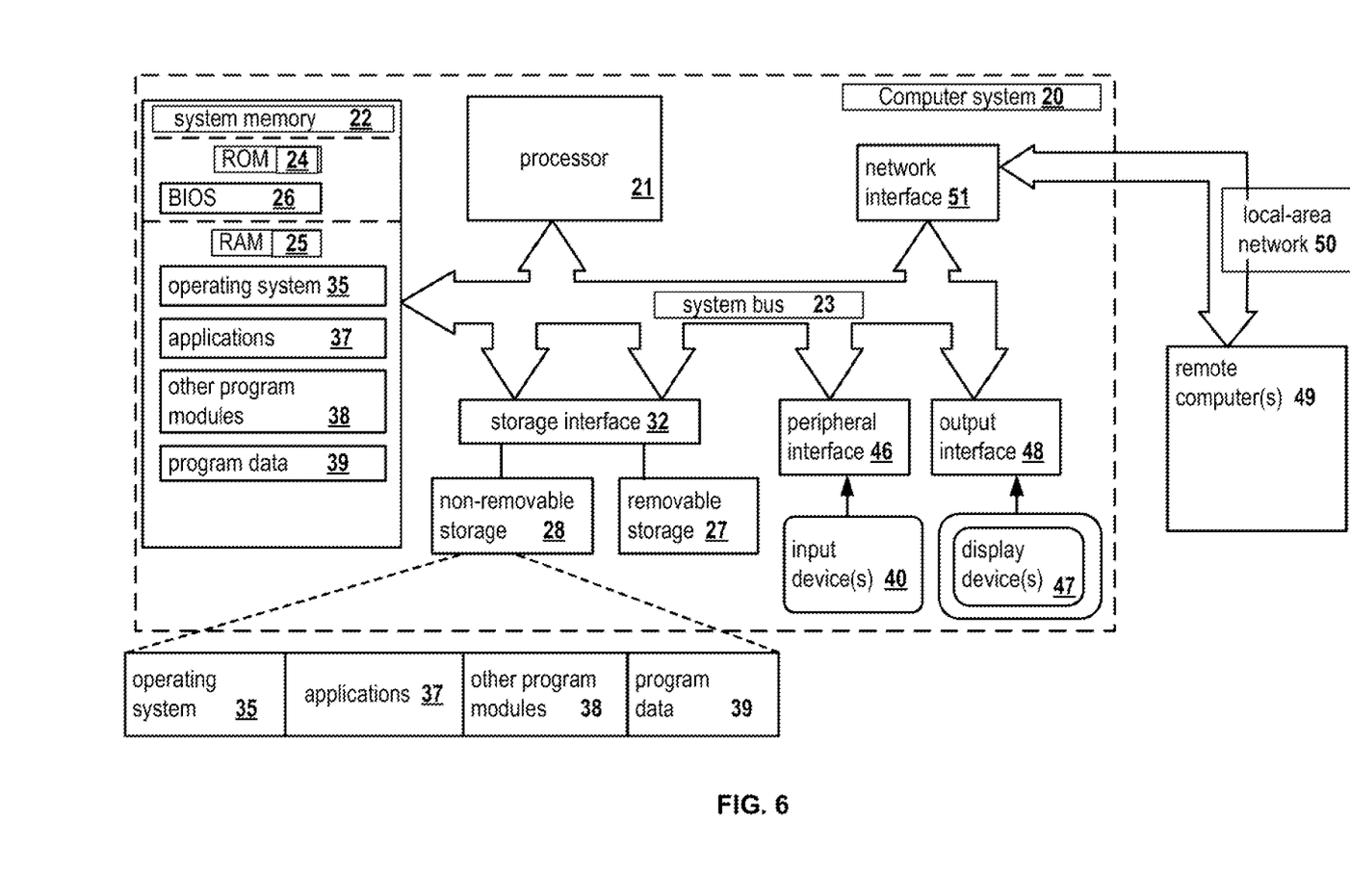
FIG. 6 presents an example of a general-purpose computer system on which aspects of the present disclosure can be implemented.

FIG. 6 is a block diagram illustrating a computer system 20 on which aspects of systems and methods for generating file systems of data sources incompatible with anti-virus scanners may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for anti-virus (AV) scanning incompatible data sources, the method comprising:
   receiving, from an AV scanner, a request to scan a data source for malicious activity, wherein the data source comprises a plurality of files, and wherein the AV scanner has a plurality of compatible file types that the AV scanner is capable of scanning;
   determining that the plurality of files are inaccessible to the AV scanner in response to determining that a file type of the data source is not in the plurality of compatible file types;
   generating a file system corresponding to the data source by parsing contents of the data source using a software development kit (SDK) associated with the data source;
   generating a virtual volume comprising a plurality of sparse files corresponding to the plurality of files in the data source;
   populating at least one sparse file in the virtual volume with respective parsed content of a corresponding file in the data source; and
   instructing the AV scanner to scan the virtual volume.

2. The method of claim 1, wherein populating the at least one sparse file is in response to receiving a request to scan the corresponding file from the AV scanner.

3. The method of claim 1, further comprising:
   in response to receiving, from the AV scanner, an indication that the populated at least one sparse file is malicious, removing the corresponding file in the data source.

4. The method of claim 1, further comprising:
   in response to receiving, from the AV scanner, an indication that the populated at least one sparse file is not malicious, removing the respective parsed content from the populated at least one sparse file.

5. The method of claim 1, wherein the virtual volume represents a slice of the data source at first time, further comprising:
   generating another virtual volume corresponding to the data source at a second time after the first time;
   mounting the another virtual volume; and
   instructing the AV scanner to scan the another virtual volume.

6. The method of claim 5, further comprising:
   receiving, from the AV scanner, an indication that a file in the another virtual volume is malicious;
   determining whether the file was in the data source during the first time by mounting the virtual volume; and
   in response to determining that the file was in the data source during the first time, marking the slice as unsuitable for backup recovery.

7. The method of claim 1, wherein the data source is one of: a relational database management system (RDBMS), a content management system (CMS), and a mail database.

8. The method of claim 1, where each respective sparse file in the virtual volume is empty and has a virtual size corresponding to a size of a respective file in the data source that corresponds to the respective sparse file.

9. A system for anti-virus (AV) scanning incompatible data sources, comprising:
   a memory; and
   a hardware processor communicatively coupled with the memory and configured to:
      receive, from an AV scanner, a request to scan a data source for malicious activity, wherein the data source comprises a plurality of files, and wherein the AV scanner has a plurality of compatible file types that the AV scanner is capable of scanning;
      determine that the plurality of files are inaccessible to the AV scanner in response to determining that a file type of the data source is not in the plurality of compatible file types;
      generate a file system corresponding to the data source by parsing contents of the data source using a software development kit (SDK) associated with the data source;
      generate a virtual volume comprising a plurality of sparse files corresponding to the plurality of files in the data source;
      populate at least one sparse file in the virtual volume with respective parsed content of a corresponding file in the data source; and
      instruct the AV scanner to scan the virtual volume.

10. The system of claim 9, wherein populating the at least one sparse file is in response to receiving a request to scan the corresponding file from the AV scanner.

11. The system of claim 9, further comprising:
   in response to receiving, from the AV scanner, an indication that the populated at least one sparse file is malicious, removing the corresponding file in the data source.

12. The system of claim 9, further comprising:
   in response to receiving, from the AV scanner, an indication that the populated at least one sparse file is not malicious, removing the respective parsed content from the populated at least one sparse file.

13. The system of claim 9, wherein the virtual volume represents a slice of the data source at first time, further comprising:

generating another virtual volume corresponding to the data source at a second time after the first time;

mounting the another virtual volume; and instructing the AV scanner to scan the another virtual volume.

14. The system of claim 13, further comprising:

receiving, from the AV scanner, an indication that a file in the another virtual volume is malicious;

determining whether the file was in the data source during the first time by mounting the virtual volume; and in response to determining that the file was in the data source during the first time, marking the slice as unsuitable for backup recovery.

15. The system of claim 9, wherein the data source is one of: a relational database management system (RDBMS), a content management system (CMS), and a mail database.

16. The system of claim 9, where each respective sparse file in the virtual volume is empty and has a virtual size corresponding to a size of a respective file in the data source that corresponds to the respective sparse file.

17. A non-transitory computer readable medium storing thereon computer executable instructions for anti-virus (AV) scanning incompatible data sources, including instructions for:

receiving, from an AV scanner, a request to scan a data source for malicious activity, wherein the data source comprises a plurality of files, and wherein the AV scanner has a plurality of compatible file types that the AV scanner is capable of scanning;

determining that the plurality of files are inaccessible to the AV scanner in response to determining that a file type of the data source is not in the plurality of compatible file types;

generating a file system corresponding to the data source by parsing contents of the data source using a software development kit (SDK) associated with the data source;

generating a virtual volume comprising a plurality of sparse files corresponding to the plurality of files in the data source;

populating at least one sparse file in the virtual volume with respective parsed content of a corresponding file in the data source; and instructing the AV scanner to scan the virtual volume.

* * * * *